P. KUCERA.
RING MOLD FOR GLASS PRESSES AND THE LIKE.
APPLICATION FILED JAN. 6, 1920.

1,412,358.

Patented Apr. 11, 1922.

Inventor
Peter Kucera
By Attorney
George Ramsey

UNITED STATES PATENT OFFICE.

PETER KUCERA, OF SOUTH CONNELLSVILLE, PENNSYLVANIA, ASSIGNOR TO CAPSTAN GLASS COMPANY, OF SOUTH CONNELLSVILLE, PENNSYLVANIA, A CORPORATION OF DELAWARE.

RING MOLD FOR GLASS PRESSES AND THE LIKE.

1,412,358.          Specification of Letters Patent.      Patented Apr. 11, 1922.

Application filed January 6, 1920. Serial No. 349,704.

*To all whom it may concern:*

Be it known that I, PETER KUCERA, a citizen of the United States, residing at South Connellsville, in the county of Fayette, State of Pennsylvania, have invented certain new and useful Improvements in Ring Molds for Glass Presses and the like, of which the following is a specification.

The present invention relates broadly to glass machinery and more specially to a ring mold for block molds and the like. The principal object of the present invention comprises a ring mold for block molds or the like having a body portion of relatively soft metal with the matrix groove and edge part of hardened compact metal.

Another object of the present invention is a ring mold for glass presses or the like and wherein the wearing edge of the ring mold comprises condensed metal which is more dense and of greater hardness than the body portion of the ring mold.

Another and further object of the present invention is a ring mold for glass presses or the like having a wearing edge of hardened dense metal.

A still further object of the present invention is a ring mold for pressing glass and the like, wherein the inner wearing edge of the ring mold is formed of metal which has been displaced by compression and condensed to a hardness greater than the adjacent surrounding metal whereby the inner edge is adapted to sustain wear.

A still further object of the present invention is a ring mold having the metal adjacent the edge of the mold hardened to produce a zone of compact dense metal adapted to withstand high temperatures and wear.

A further object of the present invention is a mold for glassware and the like having an edge portion comprising metal that has been condensed and hardened by compressing metal upon itself in such manner as to provide a hardened edge supported by softer metal.

I am aware of the fact that the present invention may be carried out in articles of manufacture other than the specific devices herewith used as a disclosure of the invention, so therefore, I desire it to be understood that the disclosure herein is to be considered as illustrative and not in the limiting sense.

Figure 2:
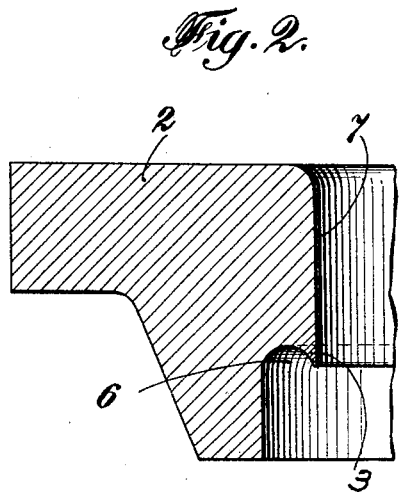
Figure 1:
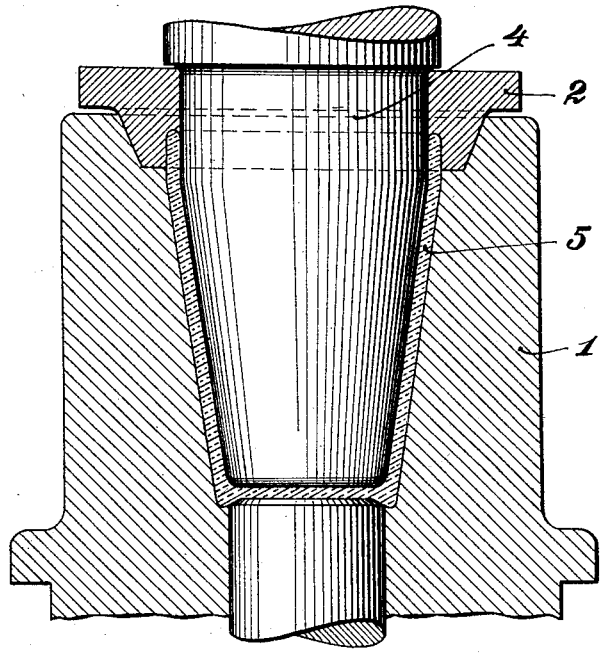

Referring now to the drawings, Figure 1 illustrates the manner and operation of a ring mold cooperating with a block mold and plunger for manufacturing glass tumblers;

Figure 2 is a view illustrating in detail a cross-section of a part of a ring mold and showing the condition of hardness of the section.

In the manufacture of pressed glassware it is customary to introduce a plastic charge of hot glass into a mold which comprises a block of material, usually metal, in the form of a cup, the interior diameter of which corresponds to the exterior diameter and shape of the article to be made. A plunger having the shape of the interior of the article is forced into the mold with a sufficient pressure to displace the plastic glass and cause it to flow between the walls of the mold and the plunger. It is necessary to use some type of device to finish the upper edge of the article and this is usually done by a separate mold part known as a ring mold, which is tightly held in position on the block mold when the plunger is driven into the block mold so that the upper or finished edge of the glass article, for example, a tumbler, is finished by the ring mold and the plunger. In this operation it is not unusual that several thousand pounds of pressure are applied to the plunger and the variation of glass between mold charges is taken up in the base of the article being made, that is, a large charge will make a thick base tumbler, and a smaller charge will make a thinner based tumbler. Where a large charge drops in the mold excessive pressure may be developed and glass attempts to escape between the plunger and the ring mold and sooner or later a small amount of glass works into the space between these parts. When this begins, the ring mold wears rapidly and forms "fins" or "burrs" on the upper inner edge of the tumblers being made. Obviously, as soon as these "fins" or "burrs" are of perceptible size, the ware being made is spoiled, and it is necessary to replace the worn ring mold. Heretofore it has been customary to either throw the worn rings away or, if the factory were making different sizes of tumblers, the ring mold might be entirely re-cut for larger sizes. Where a factory was making one size, this could not be done. Consequently, the rings, when worn, were usually discarded, thereby greatly adding to manufacturing cost of the finished ware.

The present invention overcomes the difficulties of the known art by providing a ring mold wherein the metal adjacent the opening of the ring is dense hard metal so that when pressure or wear comes upon this portion of the mold there is little tendency for this part to wear. The result is that a ring mold in accordance with the present invention has a much longer life than ring molds of the prior art and is better able to withstand high temperature due to the hot plastic glass.

Referring more particularly to the drawings and to Figures 1 and 2, the block mold 1 is provided at its upper edge with a recess in which the ring mold 2 is adapted to set. When the plunger 4 enters the block mold 1 having a suitable charge of glass therein, the glass article, which may comprise a tumbler 5, is pressed between the block mold, the ring mold, and the plunger. It is obvious that the glass is displaced upwardly around the plunger 4 as the plunger descends into the mold and that in view of the plastic condition of the melted glass it attempts to escape between the plunger and the ring mold. This tendency places extra heavy duty upon the small corner or edge 5 of the ring mold.

Referring more especially to Figure 2, which illustrates a section of the ring mold in accordance with the present invention, it is to be noted that the edge 3 adjacent the recess 6 is illustrated as being formed of hardened or compacted metal. This greatly assists in the prolongation of the life of this edge.

The ring mold comprising the present invention may be formed in various ways so long as the lip or edge 3 is formed of hard compact metal. This may be done by various swaging or other operations or may be accomplished by suitable spinning operations. Preferably the hardness is obtained by some metal operation which contacts the material forming the lip or edge thereby making the metal more dense at this particular point where wear is excessive.

Having described my invention, what I claim is:

1. As an article of manufacture a mold for pressed glassware, said mold comprising a matrix of suitable material having portions thereof composed of hardened and compacted material.

2. As an article of manufacture a mold for pressed glassware, said mold comprising a body portion of suitable metal, the edge of said body portion comprising hardened compacted metal.

3. As an article of manufacture a ring mold for pressed glassware and the like, said ring mold comprising a body portion of relatively soft metal, and having an inner edge of hardened compacted metal integral with the soft body portion.

4. As an article of manufacture a ring mold for pressed glassware and the like, said ring mold comprising a body portion of relatively soft metal and having the base of the matrix groove and an inner edge of hardened compacted metal integral with the soft body portion.

5. As an article of manufacture a ring mold for pressed glassware comprising a body portion and a lip depending from the body portion and wherein the lip comprises dense hard metal adapted to withstand excessive temperature and wear.

PETER KUCERA.